UNITED STATES PATENT OFFICE.

E. N. HORSFORD, OF CAMBRIDGE, MASSACHUSETTS.

IMPROVEMENT IN PREPARING PHOSPHORIC ACID AS A SUBSTITUTE FOR OTHER SOLID ACIDS.

Specification forming part of Letters Patent No. 14,722, dated April 22, 1856.

*To all whom it may concern:*

Be it known that I, EBEN NORTON HORSFORD, of Cambridge, in the county of Middlesex and State of Massachusetts, have invented a new and improved preparation or substance, being a substitute for a pulverulent acid, for use in the manufacture of soda-powders and other similar compounds where a dry acid is required; and I do hereby declare that the following is a full and exact description thereof and of the mode of its preparation.

Carefully washed and burned bones, after being finely ground, are sifted, with continual stirring, into freshly-diluted oil of vitriol in the following proportions: five hundred pounds of bone-ash, four hundred pounds of oil of vitriol, and one thousand pounds of water. The mass is stirred from time to time for three days, when ordinarily the action will be complete, and there will have resulted phosphoric acid, superphosphates, and sulphate of lime, with a small proportion of salts of magnesia and soda. The pasty mass may be mixed with flour or starch or any farinaceous substance while moist, and permitted slowly to dry in the sun or with the aid of artificial heat not above 150° Fahrenheit; or it may be mixed with freshly-burnt gypsum and then dried in the sun or by artificial heat; or it may be mixed with stearine or other fatty bodies and dried; or the mass may be leached and the concentrated extract mixed with burnt gypsum or stearine and dried, all of which I have found to give desirable results; but the method which on the whole is to be preferred is the following: The pasty mass is leached and the extract concentrated to 25° Baumé in an evaporating-pan of cast-iron lined with porcelain or other proper vessel. Ten gallons of this liquor are heated up to boiling and four pounds of perfectly white bone-ashes added, and the boiling continued until the whole is reduced to a little less than half its original bulk, when the concentrated liquid mass, containing in solution the added bone-ashes, becomes pasty. The hot mass is then transferred to a convenient vessel to cool over night. In the morning following add to this concentrated pasty mass seventy-six pounds of wheaten flour, which is to be mixed to a uniform paste. Then add sixteen pounds of potato-starch and most carefully mix again, after which it should turn out friable, or in a state of division such that it may be passed through a sieve with quarter-inch meshes. If not sufficiently dry, it may be spread out a short time in the sun or in a room heated to 120° Fahrenheit. The sifted mass should then be brought to a drying-chamber and spread out in trays until it becomes brittle at a temperature of from 115° to 120° Fahrenheit, when the heat may be raised to from 130° to 150° Fahrenheit and continued till the mass is thoroughly dried. When dried the preparation should be packed in close boxes or barrels to prevent the absorption of moisture.

The proportions of the agents employed may be varied somewhat without essentially affecting the result. Corn-starch and other farinaceous substances—as rice-flour or farina—may be substituted for wheaten flour and potato-starch. Bone-black may be used instead of burned bones. The object is to obtain available phosphoric acid in such form that it may be intimately mixed with dry alkaline carbonates or other sensitive chemical compounds without decomposing them or entering into combination with them, except upon the addition of moisture or the application of artificial heat. This requires that the acid or acid phosphates be mixed with a neutral diluting agent, as flour or starch, to increase the extent of surface, that the action may be prompt when moisture or heat is applied, and at the same time to more or less invest the particles of acid to prevent them from action on contact while dry.

Prepared as above described, the article is white or grayish white, coarse-grained, may be readily pulverized, and with water may be stirred to an emulsion. It is exceedingly sour to the taste, but does not act when mixed with dry alkaline carbonates without the addition of water or the application of heat.

As a dry brittle powder the article has the advantages of a pulverulent acid, may be handled, weighed, stirred, &c., as tartaric acid or cream-tartar, and as a substitute for these and a variety of similar pulverulent acids and acid salts has many uses in manufactures. It may, among other uses, be mixed with dry alkaline carbonates, (carbonate of potassa or carbonate of soda,) and remain in this state without evolution of carbonic acid until moistened or heated, thus making it a substitute for cream-tartar and tartaric acid in the preparation of yeast-powder or baking-powder.

The acidified mixture prepared in accordance with the foregoing specification I have called "pulverulent phosphoric acid;" and I claim this pulverulent phosphoric acid for neutralizing alkaline bases and producing carbonic acid at will from a mixture of this pulverulent acid with alkaline carbonates upon the addition of moisture or heat, or both.

E. N. HORSFORD.

In presence of—
CHAUNCEY SMITH,
WILLIAM T. RICHARDSON.